(12) United States Patent
Bischel et al.

(10) Patent No.: US 6,856,752 B2
(45) Date of Patent: Feb. 15, 2005

(54) DEVICE AND METHOD FOR VARIABLE ATTENUATION OF AN OPTICAL CHANNEL

(76) Inventors: William K. Bischel, 740 Olive St., Menlo Park, CA (US) 94025; Tony C. Kowalczyk, 1850 Ash St., Palo Alto, CA (US) 94306

(*) Notice: Subject to any disclaimer, the term of this patent is extended or adjusted under 35 U.S.C. 154(b) by 0 days.

(21) Appl. No.: 10/702,564

(22) Filed: Nov. 6, 2003

(65) Prior Publication Data

US 2004/0091195 A1 May 13, 2004

Related U.S. Application Data

(63) Continuation of application No. 09/919,711, filed on Aug. 1, 2001, now abandoned, which is a continuation-in-part of application No. 09/630,891, filed on Aug. 2, 2000.

(51) Int. Cl.$^7$ .................................................. G02B 6/00
(52) U.S. Cl. ........................................ 385/140; 359/288
(58) Field of Search .............................. 359/288; 385/4, 385/8, 132, 14, 140

(56) References Cited

U.S. PATENT DOCUMENTS

| | | | |
|---|---|---|---|
| 3,953,620 A | 4/1976 | Chandross et al. | |
| 3,993,485 A | 11/1976 | Chandross et al. | |
| 4,712,854 A | 12/1987 | Mikami et al. | |
| 5,121,462 A | 6/1992 | Fabre et al. | |
| 5,402,514 A | 3/1995 | Booth et al. | |
| 5,796,906 A | * 8/1998 | Narayanan et al. | 385/129 |
| 5,874,187 A | 2/1999 | Colvin et al. | |
| 5,932,397 A | 8/1999 | Mustacich | |
| 6,377,716 B1 | * 4/2002 | Veldhuis et al. | 385/1 |
| 6,408,126 B1 | * 6/2002 | Hoekstra | 385/143 |
| 6,434,318 B1 | * 8/2002 | Bischel et al. | 385/140 |

OTHER PUBLICATIONS

Sang-shin Lee et al. "Variable Optical Attenuator based on a cutoff modulator with Tapered Waveguides in polymers" Journal Lightwave Technology, vol. 17, No. 12, (Dec. 1999), pp. 2556–2561.*

* cited by examiner

Primary Examiner—Mark A. Robinson
Assistant Examiner—Alessandro Amari

(57) ABSTRACT

A device for variable attenuation of an optical channel includes an elongated core surrounded by a cladding. Optical energy propagating along the longitudinal axis of the core is normally confined thereto by the difference in refractive indices between the core and cladding. The thermo-optic coefficients of the core and cladding are closely matched such that waveguide confinement is substantially invariant with respect to ambient temperature. The device further includes a thermal source arranged above the core. The thermal source is operable to generate a temperature gradient of controllable magnitude along a vertical axis extending through the core. The temperature gradient causes reduction of the local refractive index within the core relative to surrounding regions of the cladding such that a portion of the optical energy is deflected away from the thermal source and extracted from the core.

25 Claims, 11 Drawing Sheets

DEVICE AND METHOD FOR VARIABLE ATTENUATION OF AN OPTICAL CHANNEL

CROSS-REFERENCE TO RELATED APPLICATION

This application is a continuation of U.S. application Ser. No. 09/919,711, filed Aug. 1, 2001, now abandoned which is a continuation-in-part of pending U.S. application Ser. No. 09/630,891 entitled "Device and Method for Variable Attenuation of an Optical Channel" by inventors Bischel et al., filed Aug. 2, 2000. The three applications are commonly assigned.

BACKGROUND

1. Field of the Invention

The invention relates generally to optical communications, and more specifically to a variable attenuator for removing optical energy from a waveguide in a controllable manner.

2. Description of the Prior Art

The telecommunication industry is making increasing use of optical communication systems for high-bandwidth transmission of voice, video, and data signals. In optical communication systems, it is frequently necessary or desirable to precisely adjust optical signal levels entering various system components. Adjustment of optical signal levels is typically achieved by incorporating variable optical attenuators into the optical circuits. In one example, a variable optical attenuator may be employed to equalize power levels among separate channels of optical circuits implementing wavelength division multiplexing (WDM). Variable optical attenuators may also be employed to avoid exposing optical detectors to excessive signal levels, which may damage the detectors and cause them to become inoperative.

Various references in the prior art disclose attenuators for use in optical circuits. Examples of such attenuators include those described in U.S. Pat. No. 4,762,383 to Yamashita et al. ("Two Dimensional Light Beam Deflectors Utilizing Thermooptical Effect and Method of Using Same"); U.S. Pat. No. 5,881,199 to Li ("Optical Branching Device Integrated with Tunable Attenuators for System Gain/Loss Equalization"), and; U.S. Pat. No. 5,966,493 to Wagoner et al. ("Fiber Optic Attenuators and Attenuation Systems"). The attenuators described in the foregoing references, as well as other prior art attenuators, are known to suffer from operationally significant problems or limitations. These problems include sensitivity to ambient temperature, high power consumption, limited or no adjustability, the occurrence of cross-talk between adjacent channels, high coupling losses, bulkiness and slow responsiveness. Further, some prior art attenuators have moving parts that tend to degrade over time and have associated mechanical resonance.

Thus, there is a need in the optical communications art for a variable optical attenuator which overcomes the problems associated with prior art devices.

SUMMARY

In accordance with an embodiment of the invention, a variable optical attenuator is provided having at least one elongated core, a cladding surrounding the core, and a controllable thermal source and a heat sink arranged on opposite sides of the core and defining therebetween a first or vertical axis oriented transversely to the longitudinal axis of the core. The core and cladding collectively form a conventional waveguide structure, which normally confines optical energy propagating along the longitudinal axis of the core by virtue of the difference in refractive indices between the core and cladding. The core and cladding materials are preferably selected such that their thermo-optic coefficients (i.e., dn/dT, where n is the local refractive index and T is temperature) are closely matched within the ambient temperature range of interest. Matching the thermo-optic coefficients of the core and cladding ensures that the waveguide confinement (a function of the difference between the refractive indices of the core and cladding) is substantially invariant with respect to ambient temperature, thereby obviating the need to provide heating or cooling of the waveguide package.

When attenuation of the optical energy propagating along the core is desired, a control signal is applied to the thermal source, which in turn causes a temperature gradient to be developed along the first (vertical) axis extending between the thermal source and the heat sink. The temperature gradient results in a "tilted" or asymmetric refractive index profile within the core wherein the refractive index of the core increases along the first axis from the proximal core-cladding boundary (the boundary nearer to the thermal source) to the distal core-cladding boundary (the boundary more remote from the thermal source). Extraction of optical energy from the waveguide occurs when the local refractive index at the higher-temperature areas of the core (those adjacent the proximal boundary) is depressed below that of the local refractive index of the cladding immediately adjacent to the distal core-cladding boundary. This condition causes at least a portion of the optical energy propagating along the core to be transversely deflected in the direction away from the thermal source (i.e., toward the heat sink). The amount of optical energy extracted from the waveguide is controlled by adjusting the signal (for example, a voltage) applied to the thermal source. Extraction of optical energy may be facilitated by providing a relatively weakly vertically confining section in the waveguide and locating the thermal source above this section.

The invention further encompasses an attenuation system, incorporating a variable optical attenuator of the foregoing description, in which a control circuit applies a variable signal to the thermal source in accordance with a desired degree of channel attenuation and with feedback information obtained by monitoring the power level of optical energy traveling through the core. The attenuator and attenuation system of the present invention may be advantageously employed in any number of optical circuit applications where it is necessary or desirable to control optical power transmission within individual optical channels.

DETAILED DESCRIPTION

The present invention generally provides a device and method for variable attenuation of an optical channel wherein optical energy is controllably extracted from a waveguide in a preferred direction by generating a temperature gradient along an axis transverse to the longitudinal axis of the waveguide (it should be noted that the term "optical energy", as used herein, denotes electromagnetic energy in general without limitation to specific wavelengths or spectral windows). The device is constructed to avoid problems associated with prior art devices, including sensitivity to ambient temperature, thermal cross-talk between adjacent optical channels, and high power consumption. Suitable uses of the device include, without limitation, equalization of optical power levels in input channels of a wavelength division multiplexer device, span balancing, amplifier input balancing, mux-demux balancing, and optical receiver protection.

Figure 1:
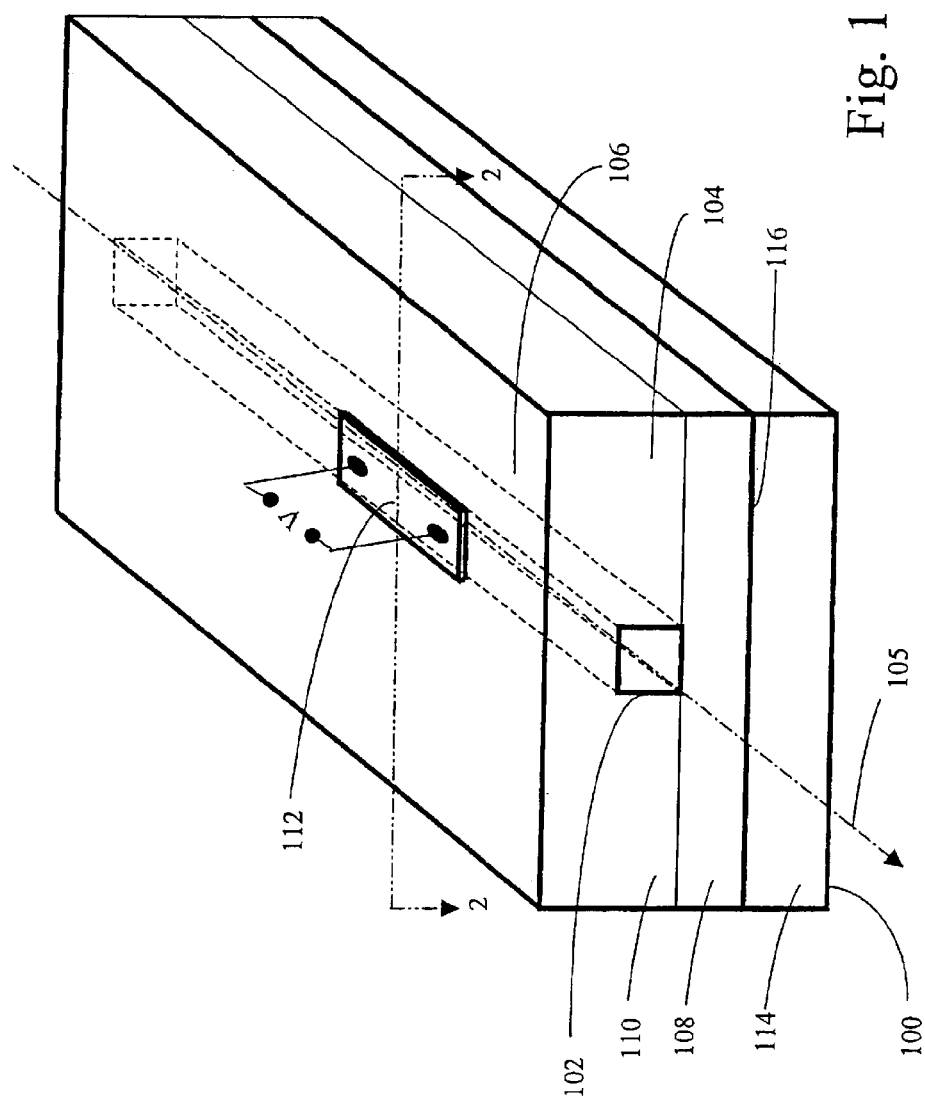
FIG. 1 is a schematic view of a device for variable attenuation of an optical channel, in accordance with a general embodiment of the invention.
Figure 2:
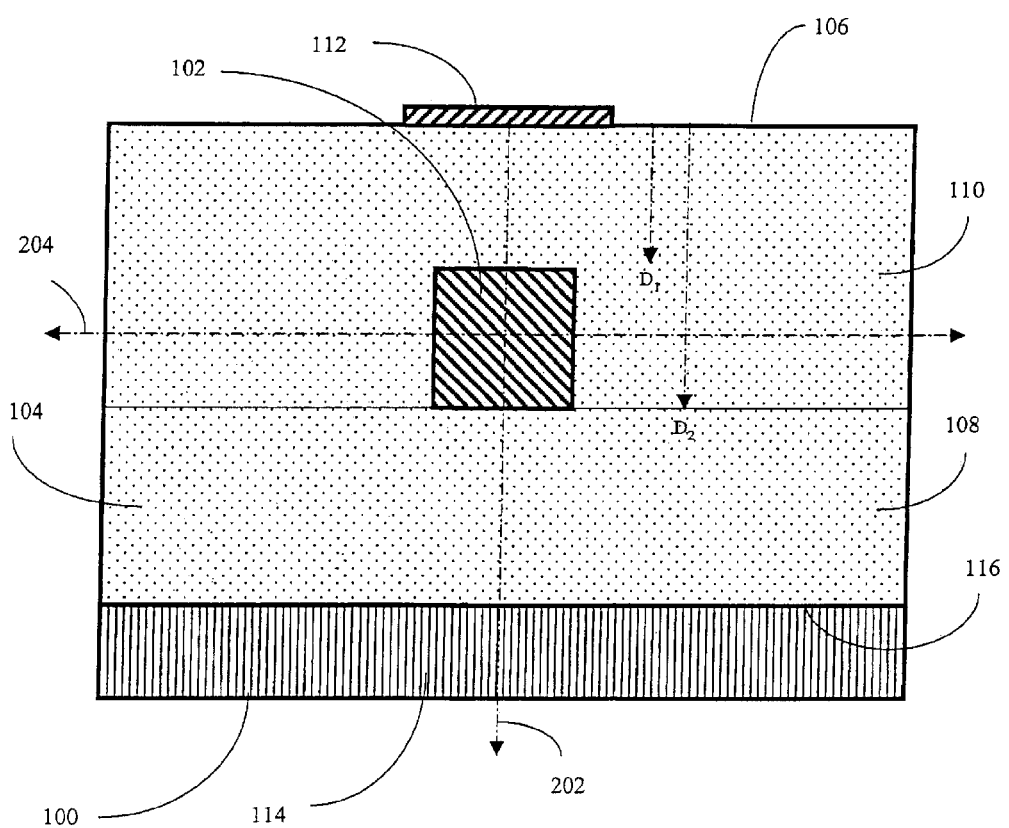
FIG. 2 is a cross-sectional view of the FIG. 1 device.

FIGS. 1 and 2 depict elements of a variable optical attenuator device (hereinafter "VOA") 100 in accordance with a general embodiment of the invention. VOA 100 includes a conventional waveguide structure having a core or confinement region (hereinafter "core") 102 surrounded by a cladding region (hereinafter "cladding") 104. Core 102 extends along a longitudinal axis (indicated by arrow 105) and is oriented in substantially parallel relation with an upper surface 106 of cladding 104 (the terms "upper", "lower", "vertical" and "horizontal" are used herein for the purpose of clarity, and are not intended to limit the device to any particular orientation). Cladding 104 is longitudinally coextensive with core 102, and may be constructed from multiple layers (such as lower layer 108 and upper layer 110) to facilitate fabrication of VOA 100, as will be discussed below in connection with FIGS. 5 and 6. The cross-sectional size and shape of core 102 may be selected to accommodate the mode (spatial distribution of optical energy) at the input fiber (not shown in FIG. 1) so as to minimize coupling losses.

VOA 100 further includes a thermal source 112 and a heat sink 114 arranged in opposed relation about core 102, with thermal source 112 contacting upper surface 106 of cladding 104 and heat sink 114 contacting a lower surface 116 of cladding 104. As is shown in FIG. 2, which depicts a cross-sectional view taken along line 2—2 of FIG. 1, thermal source 112 and heat sink 114 define therebetween a first or vertical axis (indicated by arrow 202) transverse to the longitudinal axis of core 102. Thermal source 112 may comprise, for example, a thin film heater fabricated from a segment of electrically resistive material, such as nichrome (NiCr), across which a voltage signal is selectively applied, as indicated in FIG. 1. Heat sink 114 may comprise a device substrate fabricated from a glass or other material having a relatively high thermal conductivity so as to efficiently remove heat from cladding 104. As will be discussed in greater detail below, thermal source 112 and heat sink 114 are configured to generate a controllable temperature gradient in cladding 104 and core 102 along the vertical (first) axis. This temperature gradient produces an asymmetric spatially varying refractive index profile, which causes at least a portion of the optical energy propagating along the longitudinal axis of core 102 to be deflected in the direction of heat sink and extracted from core 102.

Figure 5:
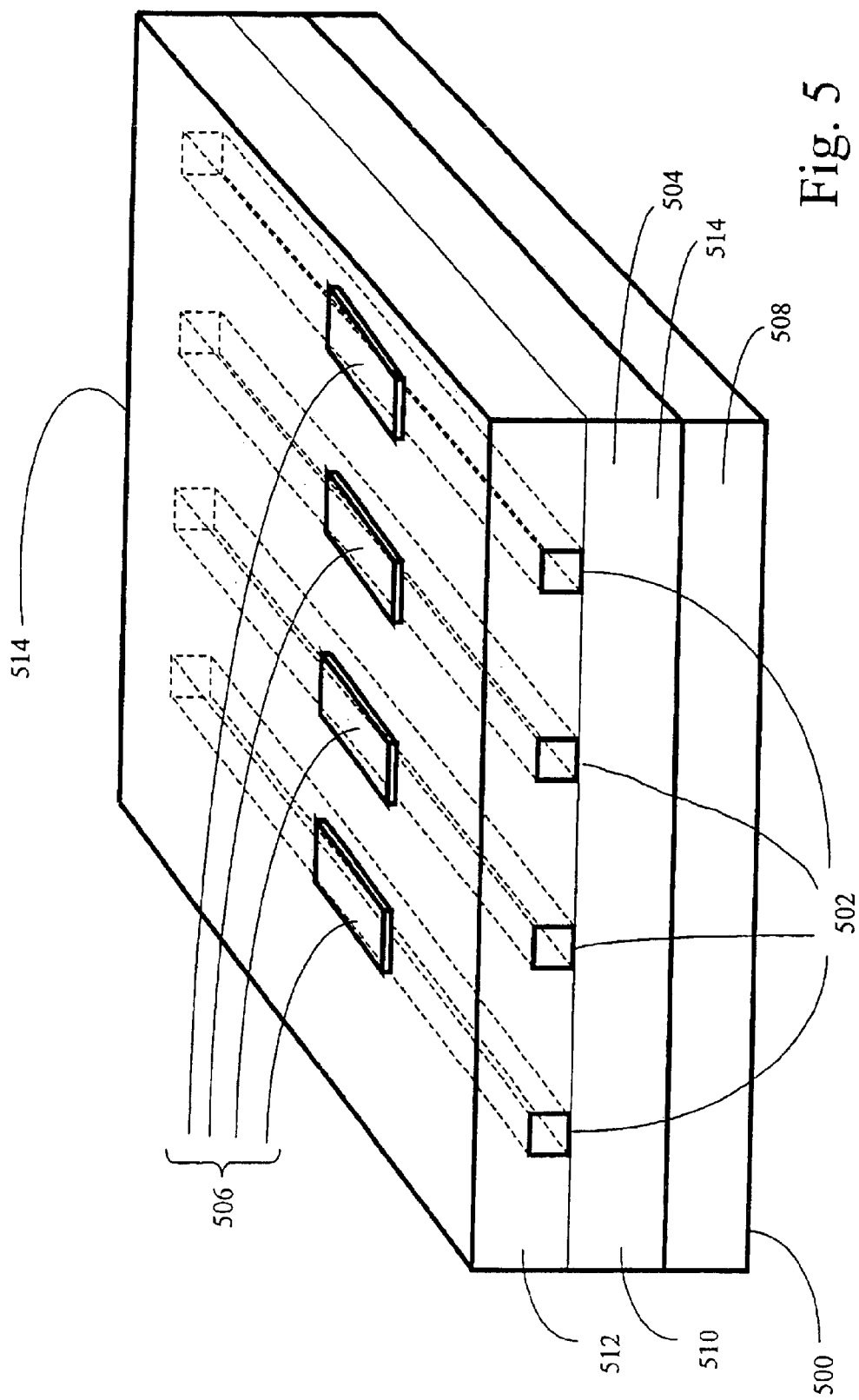
FIG. 5 is a schematic view of a more specific embodiment of the FIG. 1 device.

It will be noted that VOA 100 is depicted as having only a single waveguide structure. However, the invention contemplates attenuator devices having an array of multiple waveguide structures comprising a plurality of horizontally spaced cores (arranged either in co-planar or vertically staggered relation) embedded in the cladding. In such devices, each waveguide is associated with a separate thermal source aligned therewith to enable independent control of the attenuation of each optical channel. A specific embodiment of the invention having plural independently controlled waveguides is depicted in FIG. 5 and discussed below. It should also be noted that although core 102 is shown as being fully surrounded or circumscribed by cladding 104, alternative embodiments wherein core 102 is substantially but not fully surrounded by cladding 104 are within the scope of the invention.

It will be further noted that alternative embodiments of the invention may omit heat sink 114; however, omission of heat sink 114 may reduce overall VOA 100 performance.

Core 102 and cladding 104 are preferably fabricated from thermo-optic materials (materials which exhibit a change in refractive index in response to an increase or decrease in temperature) having negative thermo-optic coefficients (dn/dT<0, where n is the local refractive index and T is temperature), although alternative embodiments may utilize a material for core 102 or cladding 104 having a positive thermo-optic coefficient, such as glass. The materials of core 102 and cladding 104 will preferably comprise polymers, although other materials having suitable properties may be employed. To enable confinement of optical energy traveling along core 102, cladding 104 is fabricated from a material having a refractive index slightly lower (under normal conditions) than the refractive index of core 102. In a typical implementation of VOA 100, the difference Δn between the refractive indices of the core and cladding will be approximately 0.004–0.006. As is well known in the art, the refractive index difference between core 102 and cladding 104 produces confinement of optical energy traveling along the longitudinal axis of core 102 via multiple internal reflections at the core-cladding boundaries.

A significant shortcoming of prior art switching, modulating or attenuating devices based on the thermo-optic effect is that such devices are known to be sensitive to variations in ambient temperature, sometimes requiring carefully controlled cooling and/or heating of the device package to ensure reliable operation. In particular, waveguides constructed from core and cladding materials having different thermo-optic coefficients (dn/dT) will exhibit changes in Δn, and hence confinement, when the waveguide temperature is uniformly raised or lowered. In order to avoid sensitivity of VOA 100 to changes in the ambient temperature, the materials for core 102 and cladding 104 are selected to have substantially equal thermo-optic coefficients, at least within the operating temperature range of interest; in this manner, the refractive indices of core 102 and cladding 104 increase or decrease by approximately equal amounts with a corresponding decrease or increase in temperature, leaving the Δn and hence the waveguide confinement substantially unchanged. As used herein, the thermo-optic coefficients of core 102 and cladding 104 are considered to be matched or substantially equal if they are sufficiently close so as to maintain the insertion loss associated with VOA 100 within acceptable limits over the full expected operational temperature range (typically 5° C. to 85° C.). In an exemplary implementation of VOA 100, insertion loss may be limited to a maximum of 0.8 dB over an operational temperature range of −5° C. to 100° C. by selecting core and cladding materials having thermo-optic coefficients that differ from each other by no more than ten percent (10%). Improved VOA performance (e.g., lower insertion losses) may be achieved by more closely matching the thermo-optic coefficients of the core and cladding. In typical implementations of VOA 100, core 102 and cladding 104 will have thermo-optic coefficients in the range of $-2.0*10^{-4}/°$ C. to $-4.5*10^{-4}/°$ C., with a preferred value of around $-4.0*10^{-4}/°$ C.

Additional criteria for selection of materials for core 102 and cladding 104 include the following: (1) low and uniform absorption losses across the optical energy spectrum of interest (e.g., 1500–1610 nanometers for telecommunications applications); (2) mechanical and optical property stability; (3) low glass transition temperature (in the range of −40° C. to 10° C., with a preferred value of about 0° C.), and; (4) low optical birefringence. Examples of materials which generally satisfy the foregoing criteria and hence which are suitable for use in VOA 100 are discussed below in connection with FIGS. 5 and 6.

Figure 3:
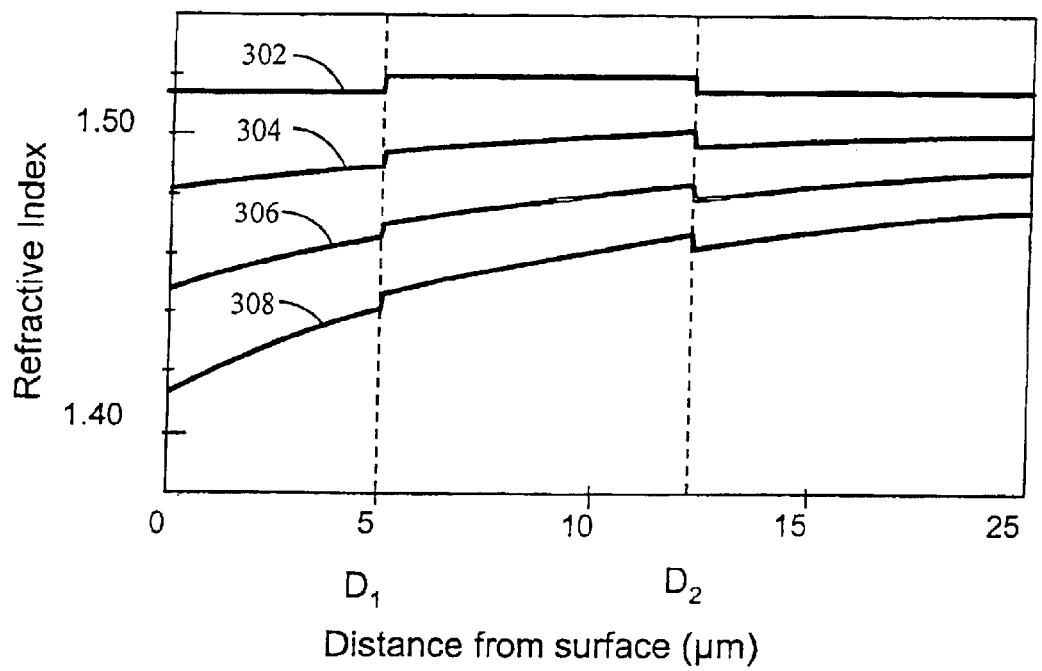
FIG. 3 is a graph showing several exemplary vertical refractive index profiles developed within the FIG. 1 device, each profile corresponding to a different level of thermal source actuation.

The operation of VOA 100 may best be understood with reference to FIG. 3, in which exemplary refractive index profiles developed along the first or vertical axis are shown for varying degrees of actuation of thermal source 112. The profiles are plotted as the local refractive index versus distance d from surface 106 along the vertical axis. A first refractive index profile 302 corresponds to a normal or non-actuated condition wherein thermal source 112 is not providing any heating, and consequently the temperature along the vertical axis is substantially uniform. Profile 302 consists of a flat region from d=0 to d=$D_1$, representative of a uniform local refractive index across the upper portion of cladding 104; a sharp increase at d=$D_1$, representative of the increase in local refractive index at the upper (proximal) cladding/core boundary; a second flat region from $D_1$ to $D_2$ representative of a uniform local refractive index across core 102; a sharp decrease at d=$D_2$ representative of the decrease in local refractive index across the lower (distal) cladding/core boundary; and, a third flat region extending beyond $D_2$ representative of a uniform local refractive index across the lower portion of cladding 104. Because the local refractive index across core 102 uniformly exceeds the local refractive index of cladding 104 adjacent to the proximal and distal core/cladding boundaries, optical energy traveling along core 102 is confined thereto.

Second refractive index profile 304 corresponds to a "low actuating" condition, wherein thermal source 112 is operated to provide a relatively small degree of heating. Heat generated by thermal source 112 (typically by resistive heating) flows along the vertical axis from cladding upper surface 106 through the upper portion of cladding 104, core 102 and lower portion of cladding 104 and into heat sink 114. The flow of thermal energy through the cladding 104 and core 102, which is limited by the thermal conductivities of the materials from which VOA 100 is formed, creates a temperature gradient along the vertical axis, the temperature being highest at a location immediately below thermal source 122 and decreasing steadily in the downward direction. Owing to the thermo-optic properties of core 102 and cladding 104, the temperature gradient produces a reduction in local refractive indices relative to the normal or non-actuating condition, the reduction being greatest where the temperature is highest and decreasing with increasing distance along the vertical axis. The temperature gradient results in a tilting of the refractive index profile of core 102, with the local refractive index increasing along the vertical axis from the proximal core/cladding boundary to the distal core/cladding boundary. This tilting is sufficient to depress the local refractive index in the upper portion of core 102 (that portion adjacent to the proximal core/cladding boundary) relative to the local refractive index of cladding 104 located immediately adjacent to the distal core/cladding boundary. The effect of the decreased local refractive index (relative to that of cladding 104 adjacent to the distal boundary) in a portion of core 102 is to cause, via refractive processes, a portion of the optical energy propagating along core 102 to be deflected downwardly out of core 102 in the direction of heat sink 114. In this manner, attenuation of the optical signal within core 102 is achieved. It is noted that the asymmetry of refractive index profile 304 effectively prevents optical energy from leaking upwards toward thermal source 112, as the local refractive index of the upper portion of cladding 104 is uniformly lower than the local refractive index within core 102. Instead, the optical energy is preferentially extracted downwards toward heat sink 114 in the direction indicated by arrow 202, into the higher local refractive index of the lower portion of cladding 104.

Refractive index profiles 306 and 308 respectively correspond to a "medium actuating" condition (where thermal source 112 is operated to provide a medium degree of heating) and a "high actuating" condition (where thermal source 112 is operated to provide a relatively high degree of heating). Increasing the amount of heating provided by thermal source 112, as represented by the progression from profile 304 to 306 and from profile 306 to 308, creates a steeper temperature gradient and more pronounced tilting of the refractive index profile of core 102. As the extent of tilting of the refractive index profile becomes greater, the local refractive index of a progressively larger portion of core 102 is depressed relative to the local refractive index of cladding 104 adjacent to the distal core/cladding boundary, leading to extraction of a larger portion of optical energy from core 102 through the distal core/cladding boundary and into the lower portion of cladding 104. The amount of optical energy extracted from core 102 may be generally expressed to be a function of the difference $\Delta n_{perturbation} - \Delta n_{confinement}$, where $\Delta n_{perturbation}$ is the difference between the local refractive index of cladding 104 immediately adjacent to the distal core/cladding boundary and the local refractive index of cladding 104 immediately adjacent to the proximal core/cladding boundary ($\Delta n_{perturbation}$ characterizing the degree of refractive index tilting arising from the presence of a temperature gradient), and $\Delta n_{confinement}$ is the difference between the local refractive index of core 102 and the local refractive index of cladding 104 immediately adjacent to the distal core/cladding boundary ($\Delta n_{confinement}$ characterizing the degree of vertical confinement and being substantially insensitive to the temperature gradient). In this manner, the attenuation of optical energy propagating through core 102 may be controlled by adjusting the operation of thermal source 112. Those skilled in the art will appreciate that when thermal source 112 is operated to provide a sufficiently high amount of heating, substantially all of the optical energy will be extracted from core 102 via refraction and diffraction.

High attenuation efficiencies (attenuation produced per unit of power consumed) may be achieved by optimizing the design of VOA 100 (including adjustment of the device's dimensions and geometry and selection of appropriate core and cladding materials) such that large vertical temperature gradients can be developed within core 102. For a typical implementation of VOA 100 having a core 102 height of 7.5 $\mu$m, an attenuation of 30 dB may be effected at relatively low power consumption if the $\Delta T$ (temperature difference between the lower and upper boundaries of the core) is greater than 4° C. (representing an average vertical temperature gradient within the core of about 0.53° C./$\mu$m), and preferably greater than 5° C. (representing an average vertical temperature gradient within the core of about 0.67° C./$\mu$m).

It should be further noted that optical energy is not deflected in the horizontal or lateral plane (indicated by arrow 204 in FIG. 2) because the heating provided by thermal source 112 does not substantially affect lateral waveguide confinement. The temperature gradient along the lateral axis is significantly smaller than the gradient along the vertical axis, and may be controlled by adjusting the width of thermal source 112. A thermal source having a width close to or exceeding the width of core 102 will produce a substantially uniform lateral temperature profile across core 102 and portions of cladding immediately adjacent thereto. This condition will result in refractive index decreases of similar magnitude for horizontally aligned portions of the core 102 and cladding 104, thereby preserving horizontal waveguide confinement. Minimization of the horizontal temperature gradient may also be achieved by adjusting the geometry and configuration of thermal source 112, such as by use of the "pedestal" configuration discussed below in connection with FIG. 7(a), or by increasing the depth of core upper layer 110.

Figure 4:
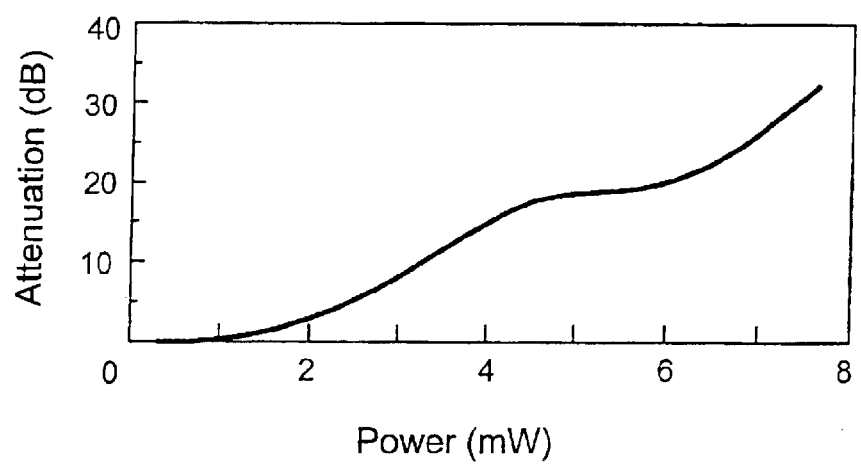
FIG. 4 is a graph showing the amount of attenuation achieved within the FIG. 1 device versus thermal source actuation.

FIG. 4 depicts the relationship between the amount of actuation, expressed as the power consumed by thermal source 112 and the resultant attenuation of optical energy propagating along core 102, expressed in decibels, measured in connection with a exemplary implementation of VOA 100. The amount of attenuation is shown to increase monotonically with increasing thermal source actuation, with the attenuation-power consumption relationship being quasi-linear over a substantial portion of the depicted power consumption range. This relationship between attenuation and thermal source actuation is representative of the ability of VOA 100 to provide precise control of the optical power over an extended range of attenuation (0–30 dB) by simply adjusting the power supplied to thermal source 112. Those skilled in the art will also observe that high degrees of attenuation may be achieved with relatively low power consumption. For example, an attenuation of 15 dB requires only about four milliwatts (4 mW) of power. In other typical implementations of VOA 100, an attenuation of 10 dB may be achieved at a thermal source power consumption of less than 5.0 mW (preferably around 3.5 mW), an attenuation of 20 dB may be achieved at a thermal source power consumption of less than 10.0 mW (preferably around 6.5 mW), and an attenuation of 30 dB may be achieved at a thermal source power consumption of less than 15.0 mW (preferably around 10.0 mW).

The response time of VOA 100 (the time it takes VOA 100 to go from a non-actuated state to an actuated state providing a desired amount of attenuation and vice-versa) will typically be less than 10 milliseconds. The actual response time will of course depend on a variety of design and performance parameters. In a preferred implementation of VOA 100, rise times (the time it takes to attain a desired actuated state from an unactuated state) are around 3.1, 1.4, 0.55 and 0.27 milliseconds for (respectively) actuated states providing 5, 10, 20, and 30 dB of attenuation. Corresponding fall times (time from an actuated state to an unactuated state) for the preferred implementation are around 1.26, 1.61, 2.5, and 4.2 milliseconds.

Examination of the attenuation-power consumption curve of FIG. 4 reveals a plateau region beginning at a power consumption of approximately 4.5 mW. It has been postulated that the decrease in the attenuation efficiency represented by the plateau region results from reflection of a portion of the deflected optical energy from the cladding/substrate boundary, the reflected light being re-coupled into core 102. It may be possible to reduce this effect through optimization of the geometry and materials of VOA 100. Specifically, reflection from the cladding/substrate boundary may be reduced or eliminated by matching the refractive indices of the cladding and substrate materials, or alternatively, by interposing a relatively thick adhesion layer between the cladding and substrate, the refractive index of the adhesion layer being matched to that of the cladding. Another possible solution to the above-described "re-coupling" problem involves roughening the surface of the substrate contacting the cladding, thereby randomizing the angle of reflection of the reflected optical energy, which in turn reduces the fraction of the reflected optical energy re-coupled into core 102. Yet another solution to the re-coupling problem consists of disposing a set of longitudinally spaced "reflection blockers" at or proximal to the cladding/substrate boundary. The reflection blockers comprise vertically oriented specular reflectors which avoid re-coupling into core 102 by redirecting optical energy such that it is not reflected from the cladding/substrate boundary and/or by redirecting optical energy reflected at the cladding/substrate boundary such that it is not re-coupled into core 102.

The fabrication of a specific embodiment of the invention will now be discussed in connection with FIGS. 5 and 6. FIG. 5 depicts a VOA 500 closely similar in many respects to VOA 100 of FIGS. 1 and 2. In contrast to FIG. 1, however, which depicts only a single waveguide, VOA 500 is provided with an array of four waveguides comprising elongated thermo-optic cores (individually and collectively denoted as 502) set in thermo-optic cladding 504, each waveguide carrying a separate optical signal. Cores 502 are arranged in co-planar, mutually parallel relation with typical horizontal spacing of 250 $\mu$m between adjacent cores. Each core 502 is substantially aligned and in thermal association with a thermal source (individually and collectively denoted as 506) uniquely corresponding thereto, each thermal source 506 being operable to generate a temperature gradient in the associated core 502 along a vertical or first axis extending between thermal source 506 and substrate 508 (which serves as a heat sink) which in turn causes at least a portion of the optical energy traveling along core 502 to be deflected downwardly in the direction of substrate 508 and thereby extracted from core 502.

In a preferred implementation, substrate 508 is formed from a commercially available glass material such as Corning® 1734 flat glass, but may alternatively be formed from any suitable material having sufficiently high thermal conductivity to rapidly conduct heat away from cladding 504. The thickness of substrate 508 will be chosen in view of mechanical, thermal and processing requirements. Typical substrate thickness for VOA 500 will be about 1000 $\mu$m.

Figure 6:
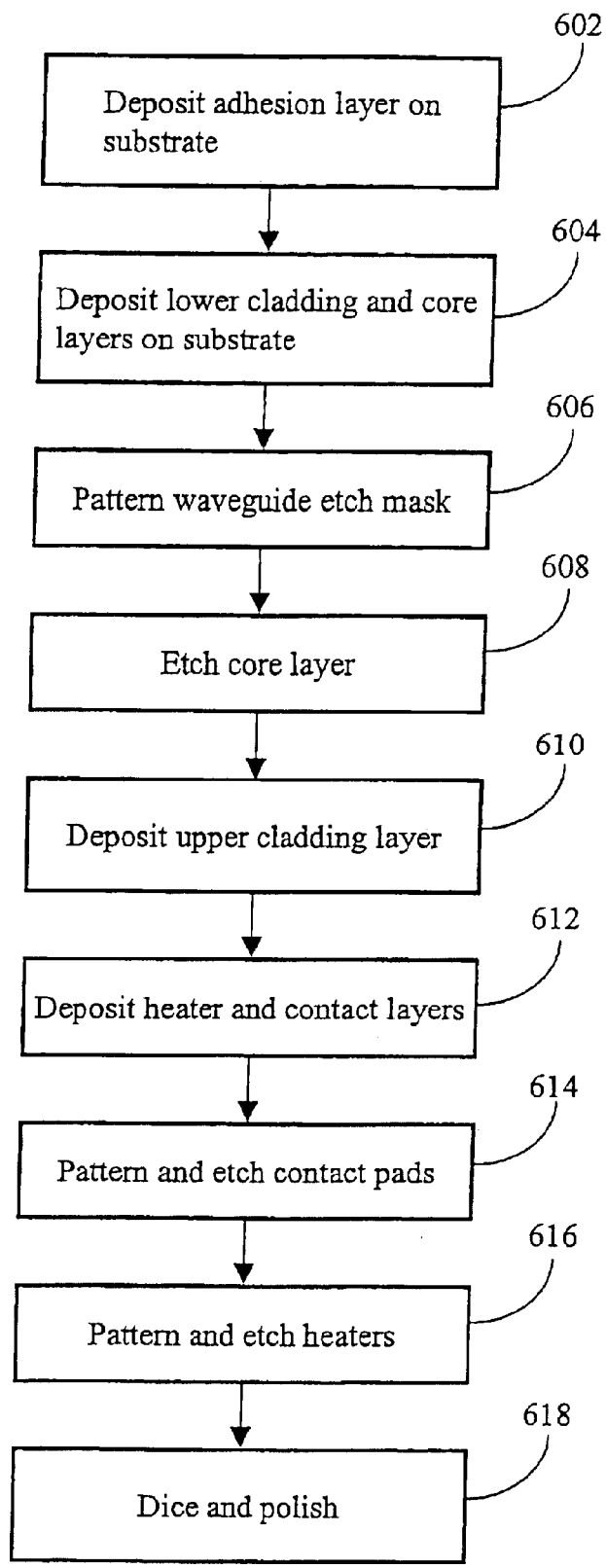
FIG. 6 is a flowchart depicting the steps of a method for constructing the FIG. 5 device.

In the first step 602 of the VOA fabrication method depicted by the FIG. 6 flowchart, an adhesion layer is deposited on substrate 508 to promote adhesion between substrate 508 and a lower cladding layer 510. The adhesion layer will typically comprise a commercially available substance such as AZ 4330 positive photoresist, and is preferably deposited to a thickness of about 3 $\mu$m.

Next, in step 604, planar lower cladding layer 510 and a planar core layer are sequentially deposited on substrate 508. Lower cladding layer 510 will preferably comprise Norland Optical Adhesive 68 (NOA 68, available from Norland Products of New Brunswick, N.J.), which has a refractive index of 1.534 and a thermo-optic coefficient of $3.3 \times 10^{-4}$, although other optically transparent polymeric or non-polymeric materials having suitable properties may be substituted. A standard polymer layer deposition procedure may be employed for deposition of lower cladding layer 510, comprising viscosity adjustment prior to deposition, spinning, and curing with ultraviolet light (which cross links the polymer chains and creates a robust layer). Other methods which may be utilized to deposit lower cladding layer 510 include meniscus, extrusion, spray, dip, evaporation coating, or sputtering. Lower cladding layer 510 may be deposited to a preferred thickness of about 9.5 $\mu$m.

A core layer is then deposited on top of lower cladding layer 510. The core layer will preferably be formed from a material having the same polymer structure as lower cladding layer 510 (e.g., NOA 68) to which a refractive index-raising additive has been added. The additive will preferably raise the refractive index of the core layer by about 0.006 relative to lower cladding layer 510, yielding a core layer refractive index of 1.540 for the NOA 68 example. Because the basic chemical structures of the core layer and lower cladding layer 510 are generally the same, their thermo-optic coefficients are matched, thereby making the refractive index difference substantially invariant with ambient temperature. The core layer is preferably deposited by the standard deposition techniques alluded to above to a thickness of about 6.4 $\mu$m.

In the third step 606, aluminum is sputtered and patterned via lithography to form a reactive ion etching (RIE) mask for waveguide fabrication. The RIE mask features, which define cores 502, will preferably comprise parallel lines having a width of about 6.4 $\mu$m which run along the entire length of the mask. As referenced above, the lateral core spacing will typically be about 250 $\mu$m. The unmasked portions of the core layer (representing the regions between adjacent cores 502, are then removed by RIE, step 608. Other wet and dry etching techniques known in the art may be used in place of the RIE technique for defining cores 502.

The cross-sectional dimensions and refractive index of cores 502 will preferably be selected to produce single mode operation in the optical energy wavelengths of interest. In the foregoing example, cores 502 will have a square cross-section with a width and height of 6.4 $\mu$m, which produces single mode operation for optical energy having a wavelength of 1.55 $\mu$m, which is a typical wavelength used for telecommunications applications.

Next, in step 610 the RIE etch mask is removed and an upper cladding layer 512 is deposited on top of lower cladding layer 510 and cores 502, thereby forming buried channel waveguides. The material of upper cladding layer 512 may be identical to that of lower cladding layer 510 (e.g., NOA 68 for the example discussed above). Deposition of upper cladding layer 512 may be accomplished by the same standard polymer deposition technique used for deposition of lower cladding layer 510 and the core layer. Upper cladding layer 512 is preferably deposited to a thickness of about 10 $\mu$m.

In alternative embodiments of VOA 500 upper cladding layer 512 may be fabricated from two or more sub-layers in order to optimize various properties of upper cladding layer 512. For example, upper cladding layer 512 may comprise a upper sub-layer of a first material and a lower sub-layer of a second material, the first material selected to have a low refractive index in order to provide more effective optical isolation of the mode from thermal source 506, and the second material selected to provide good confinement of the mode. In this manner, it may be possible to construct VOA 500 with a thinner overall upper cladding layer 512 thickness (which advantageously increases the thermal gradient obtainable within core 102) and/or to improve other mechanical or optical properties of VOA 500.

It is noted that other polymeric material sets may be employed to fabricate the core and cladding layers in lieu of the NOA-68 material set described above. Non-limiting examples of polymer material sets suitable for fabrication of VOA 500 include the following: fluorinated acrylates, siloxane-based polymers, and polyimides.

Next, NiCr (used to form thermal sources 506) and gold layers (used to form electrical contact pads, which are not depicted in the figures) are sequentially deposited by sputtering on top of upper cladding layer 512 to form a two-layer metal structure, step 612. The NiCr layer will be deposited to a thickness sufficient to achieve the desired electrical resistance of thermal sources 506. For thermal sources 506 having preferred dimensions of 12 $\mu$m wide by 300 $\mu$m length, the target electrical resistance is 300 $\Omega$.

In step 614, gold electrical contact pads, for electrically connecting thermal sources to lines carrying the thermal source control signals, are defined and formed using conventional photolithography techniques. Briefly, photoresist is deposited on the gold layer by spinning and exposed through a contact pad mask. The exposed regions of the gold layer are subsequently removed using a gold etch solution, thereby defining the contact pad. Typical dimensions of the contact pads are 200 $\mu$m by 200 $\mu$m.

Thermal sources 506 are then formed using conventional photolithography techniques, step 616. Photoresist is deposited on the NiCr layer and exposed through a thermal source mask. The thermal source mask is preferably positioned to align the thermal source features with the underlying cores 502, such that the resultant thermal sources 506 (i.e., thin film heaters) have their longitudinal axes centered above and parallel to the longitudinal axes of corresponding cores 502. The exposed regions of the NiCr layer are then removed using a NiCr etch solution to thereby define thermal sources 506. Typical dimensions for thermal sources 506 will 6–20 $\mu$m width by 150–450 $\mu$m length, with the preferred width and length being around 12 $\mu$m and 300 $\mu$m, respectively.

It is to be appreciated that, in a typical production environment, multiple VOA 500 devices may be formed simultaneously on a common substrate. In step 618, individual VOA 500 devices are separated by dicing the common substrate. End faces 514 are then polished to enable coupling of optical energy in and out of cores 502.

While specific techniques for electrically connecting thermal sources 506 to a control signal source have not been described herein, those skilled in the art will recognize that various well-known methods and structures may be employed for this purpose.

Figure 7A:
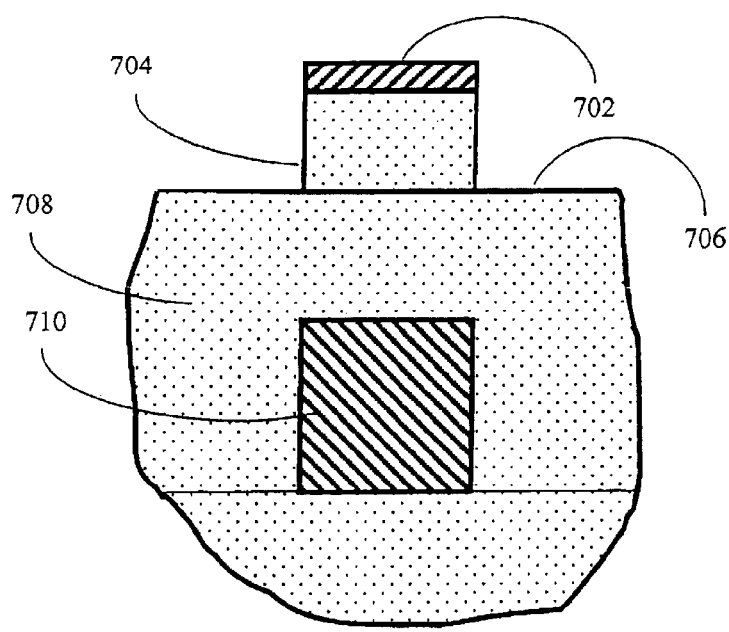
FIGS. 7(a) and 7(b) depict alternate thermal source geometries and arrangements for the FIG. 5 device.
Figure 7B:
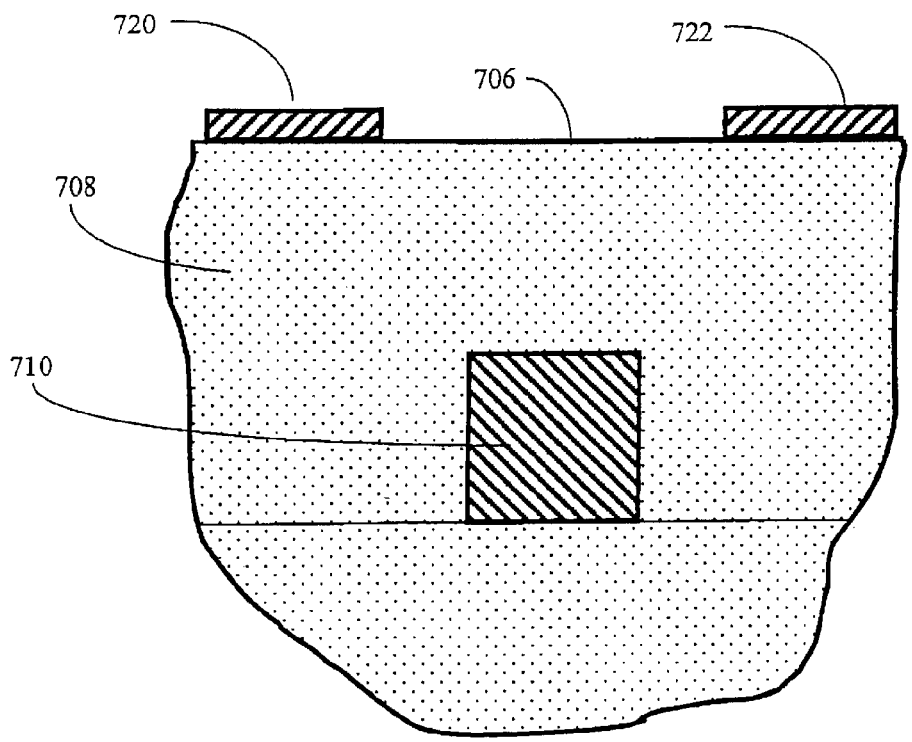

FIGS. 7(a) and 7(b) are fragmentary cross-sectional views depicting alternative geometries and configurations of the thermal source. In FIG. 7(a), a thermal source comprising a thin film heater 702 is positioned atop a pedestal region 704 extending upwardly from upper surface 706 of cladding 708 and is in substantial vertical alignment with core 710. It is believed that the geometry depicted in FIG. 7(a) will tailor the flow of thermal energy from heater 702 to the heat sink (not shown) such that the temperature gradients produced within core 710 and surrounding cladding 708 are maximized along the vertical axis and minimized along the horizontal axis, which in turn will increase device efficiency (in terms of power consumed per unit of attenuation). Pedestal 704 may be formed, for example, by using heater 702 as a mask while etching the upper margins of cladding 708 by the required amount.

FIG. 7(b) depicts another alternative configuration of the thermal source wherein two horizontally spaced thin film heaters 720 and 722 are employed in place of a single heater. Thin film heaters 720 and 722 are positioned in contact with upper surface 706 of cladding 708 and are horizontally offset by equal distances from the centerline of core 710. Heaters 720 and 722 are preferably interconnected such that each heater received the same thermal source control signal (e.g., an identical voltage). This arrangement offers the advantage of locating heaters 720 and 722 a greater overall distance from core 710, thus further reducing absorption of the optical mode by the thermal source.

It will be realized by those skilled in the art that other geometries, arrangements, and sizes of thin film heaters may be utilized to optimize various operational and design aspects of the VOA. For example, multiple heaters may be placed over a waveguide core to increase the maximum achievable attenuation.

According to yet another embodiment of the invention, a VOA (not depicted) is provided wherein each waveguide has two or more longitudinally spaced thermal source zones, each zone being associated with a thin film heater or other thermal source. At the thermal source zone located upstream in the optical path, a portion of the optical energy refracted by the thermo-optic effect is reflected upwardly at the distal core/cladding boundary and remains within the core. The longitudinal spacing and size of the thermal source(s) located downstream in the optical path is selected such that the downstream thermal source acts to increase the vertical momentum component of the previously reflected wavefront, thereby avoiding cancellation occurring between the reflected and diffracted wavefronts at the downstream thermal source zone(s) and increasing the attenuation efficiency of the VOA.

Figure 8:
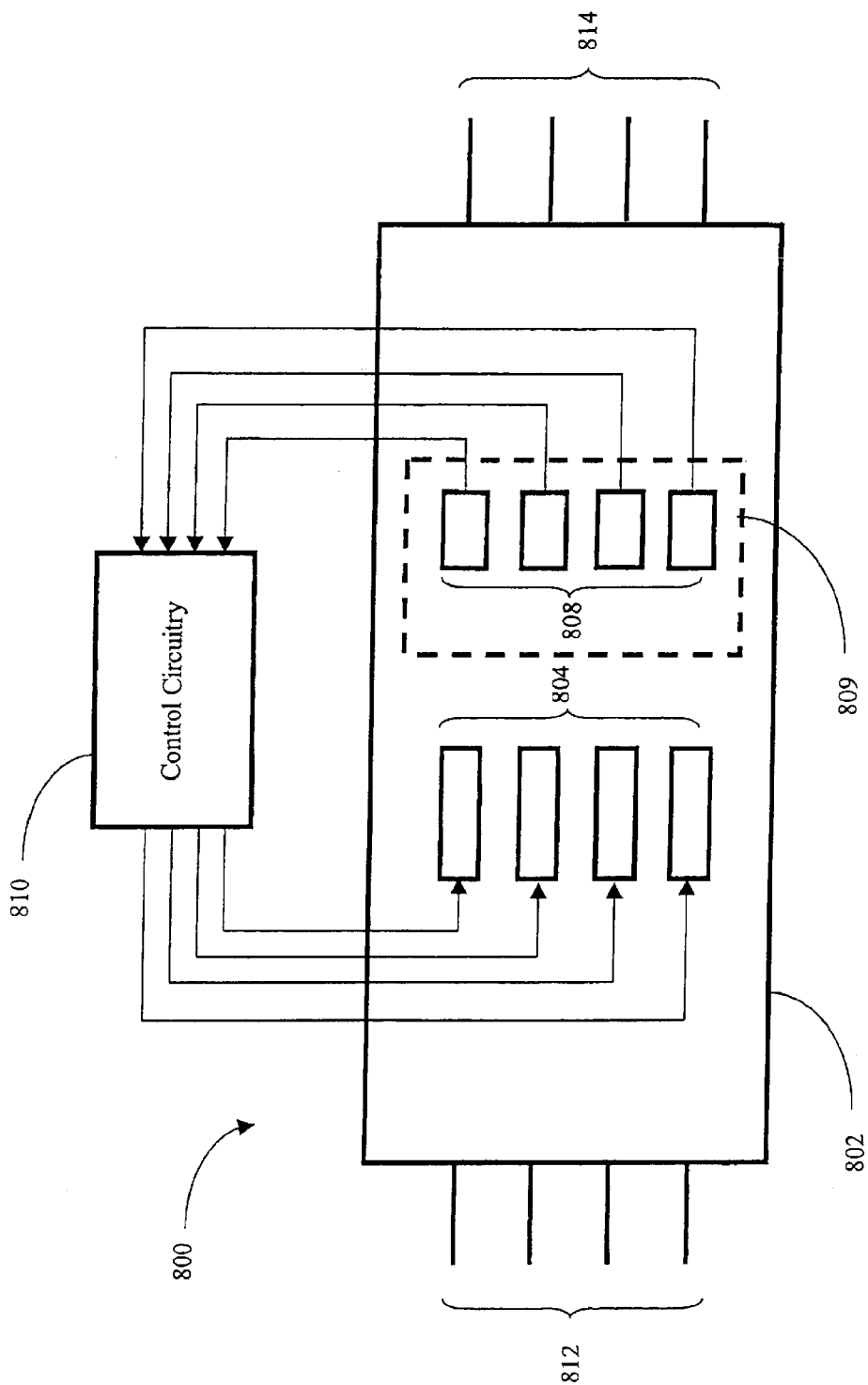
FIG. 8 is a block diagram of an attenuation system, in accordance with one embodiment of the invention.

FIG. 8 schematically depicts an attenuation system 800 in accordance with the present invention. Attenuation system 800 includes a VOA 802 of similar description to VOA 500 described above in connection with FIGS. 5 and 6. VOA 802 is provided with a plurality of waveguides individually comprising an elongated core embedded in a cladding. Each waveguide has in operational association therewith a thermal source (individually and collectively denoted as 804) for generating a thermal gradient across the core and surrounding cladding to enable the controlled extraction of optical energy in the direction away from thermal source 804 in the manner described above. To enable measurement of the amount of optical energy (i.e., an optical power level) in the core at a location downstream of the thermal source, each waveguide is optically coupled to a conventional optical sensor or detector (individually and collectively denoted as 808) configured to measure the optical power level within the core and to responsively generate an output signal representative of the measured power level. Coupling of the waveguides to the sensor 808 array (each sensor 808 uniquely corresponding to a waveguide) may be achieved using optical taps or similar expedient well known in the art. Sensors 808 may comprise, for example, an integrated germanium detector array formed on a separate platform 809 and attached to VOA device 802 using conventional alignment and attachment techniques.

The sensor output signals are conveyed as input to control circuitry 810, which is configured to determine, for each waveguide, the amount of attenuation required to meet a set of predetermined conditions (e.g., equalization of optical power levels among the several waveguides). Control circuitry 810 is further configured to apply a thermal source control signal to each thermal source 804, the signal being of appropriate strength to effect the required amount of attenuation. As is known in the art, the thermal source control signals applied to thermal sources 804 may be determined by control circuitry 810 in accordance with pre-established input-output relationships, and may be adjusted on a continuous basis to reflect variations in the downstream optical power, as measured by sensors 808.

VOA 802 may be coupled to input optical fibers 812 (which carry the input optical signals) and output optical fibers 814 (which carry the post-attenuation output optical signals) using any one of a variety of coupling techniques. Input and output optical fibers 812 and 814 will typically comprise standard commercially available fibers, such as the SMF-28™ single mode fiber available from Corning Incorporated of Corning, N.Y. Coupling of fibers 812 and 814 to VOA 802 may be accomplished by using a silicon submount (not shown) having V-grooves for receiving and positioning the fiber ends. The submount will preferably include means for first positioning and attaching thereto a set of guide fibers, which are in turn employed to precisely align the submount with VOA 802. Following alignment and attachment of VOA 802 to the submount, input and output optical fibers 812 and 814 are attached to the submount/VOA 802 assembly using the V-grooves formed in the submount to align the fibers with the VOA 802 waveguides. Input and output coupling losses may be reduced by pigtailing the optical fiber ends and filling the gaps between the fibers and the waveguides using a UV-curing polymer or other suitable material having an index substantially equal to the index of the waveguide core material.

Figure 9A:
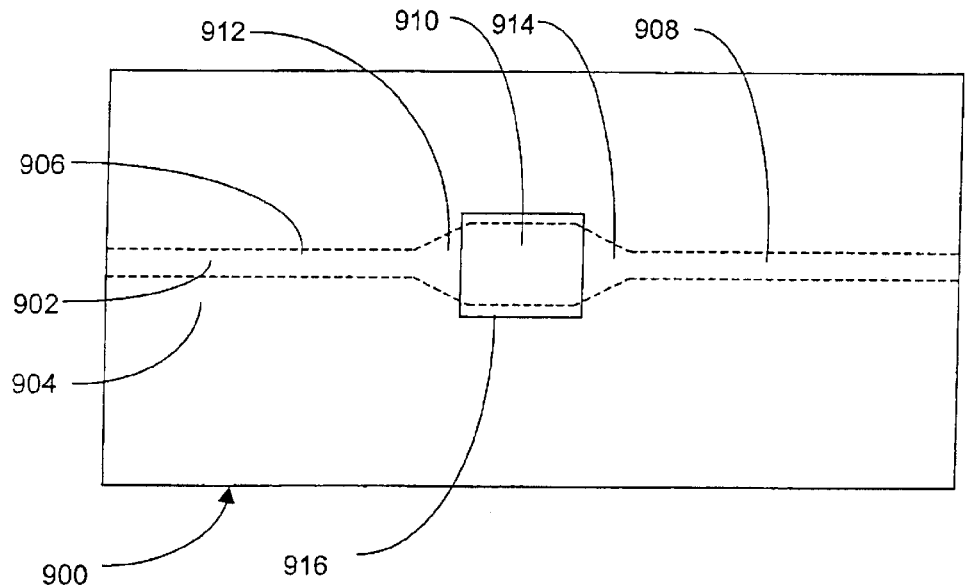
FIGS. 9(a) and 9(b) are, respectively, top plan and elevated side views symbolically depicting an alternative embodiment of the FIG. 1 device, wherein a region of reduced optical confinement is achieved by providing an intermediate waveguide section having enlarged cross-sectional dimensions.
Figure 9B:
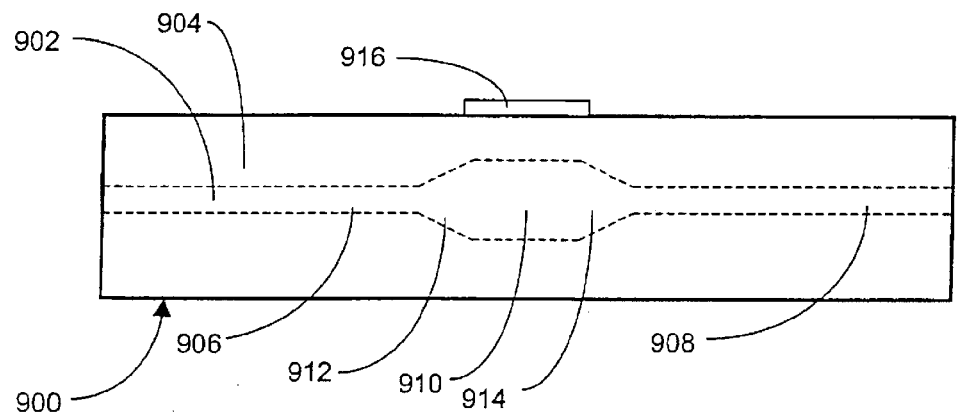

VOA performance may be improved by providing a region of reduced vertical confinement in the VOA waveguide(s) and locating the thermal source above this relatively weakly confining region. The weakly confining portion of the waveguide may be created, for example, by appropriately varying the transverse dimensions or cross-sectional geometry of the waveguide core, and/or by segmentation of the core. FIGS. 9(a) and 9(b) depict a VOA 900 according to an alternative embodiment of the present invention, wherein a region of reduced confinement is produced by expanding one or both of the transverse dimensions of a portion of core 902. A waveguide defined by core 902 and surrounding cladding 904 includes an input section 906 and output section 908, in which core 902 has a relatively small cross-sectional area, and an intermediate or weakly confining section 910, in which one or more of the transverse dimensions of the core (i.e., height and width) are expanded to produce a broadened and/or deepened waveguide. In a typical implementation of the FIG. 9 embodiment, core 902 has transverse dimensions of 7.5 μm high by 7.5 μm wide in input section 906, as compared to 10.0 μm high by 10.0 μm wide in intermediate section 910. Core 902 and cladding 904 are preferably fabricated from polymeric materials having matched thermo-optic coefficients, such as the material set described above in connection with FIG. 5. While FIG. 9 depicts both transverse dimensions of core 902 as being relatively enlarged in intermediate section 910, other implementations of the FIG. 9 embodiment may utilize a core having one constant transverse dimension and one enlarged transverse dimension. A substrate (not shown in FIG. 9) may be attached to the lower major surface of cladding 904 to provide mechanical stability and to serve as a thermal heat sink.

Intermediate section 908 is optically coupled to input section 904 and output section 906 by (respectively) tapers 912 and 914. Tapers 912 and 914 are preferably designed as adiabatic tapers to reduce losses associated with expansion and contraction of the optical mode, and may be fabricated by photolithography and etching processes known in the art. It is noted that the typical sizes and aspect ratios of tapers 912 and 914 cannot be accurately depicted in the figures due to space constraints.

A thin film heater 916 positioned above reduced-confinement section 910 is operative to generate a vertical thermal gradient in core 902 and surrounding cladding 904, causing a portion of the optical energy propagating through core 902 to be deflected in the downward direction and thereby extracted from the waveguide, in a manner similar to that described above in connection with FIG. 1. Heater 916 preferably has its longitudinal centerline aligned with that of core 902 and has a width sufficient to avoid the generation of large lateral (horizontal) thermal gradients within core 902.

As is discussed above in connection with FIG. 3, the amount of optical energy extracted from core 902 for a given amount of refractive index perturbation induced by heater 916 is negatively correlated with the degree of mode confinement. Because the cross-sectional area of core 902 increases within intermediate section 910, its effective confinement will decrease, thus allowing optical energy to be more easily deflected from core 902. Reduction of vertical confinement within intermediate section 910 thereby facilitates desired extraction of optical energy from core 902 and allows a specified amount of signal attenuation to be accomplished within a shorter distance and/or using reduced heater power consumption relative to that required in a more strongly vertically confining waveguide.

A relatively weakly confining section may alternatively be created in the waveguide by segmentation of a portion of the waveguide. The segmentation of the core may be accomplished by employing suitable fabrication techniques known in the art. The thermal source is located above the segmented portion of the core, and the reduced vertical confinement thereby facilitates extraction of optical energy as described above.

Figure 12A:
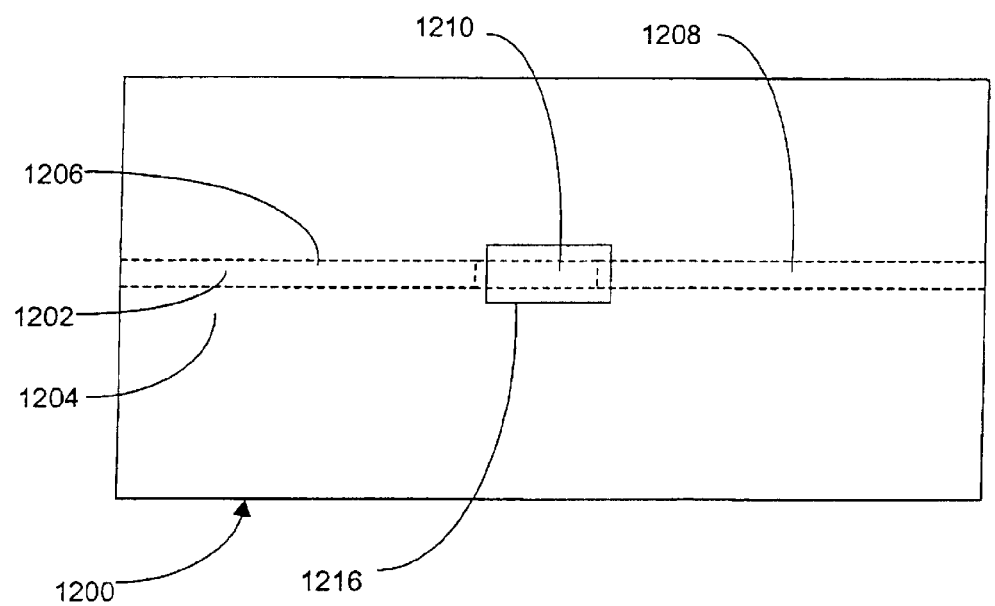
FIGS. 12(a) and 12(b) are, respectively, top plan and elevated side views symbolically depicting an alternative embodiment of the FIG. 1 device, wherein a region of reduced optical confinement is achieved by providing an intermediate waveguide section having a smaller refractive index.
Figure 12B:
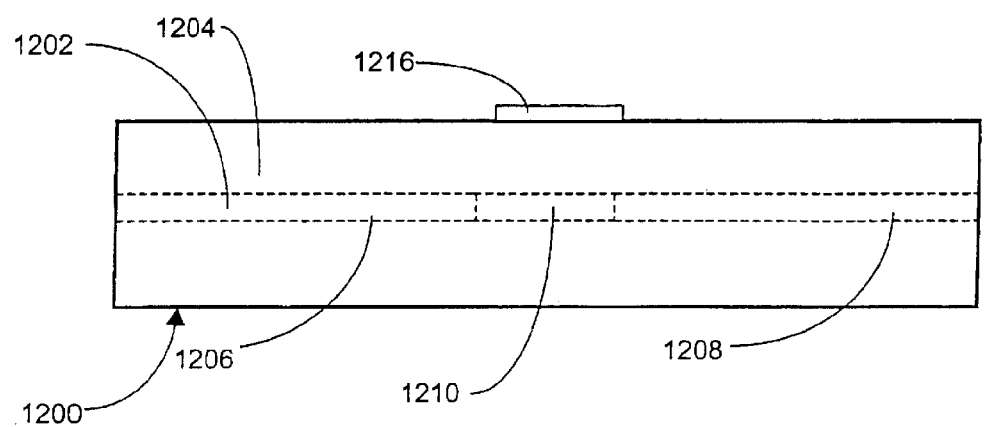

FIGS. 12(a) and 12(b) symbolically depict a VOA 1200 according to yet another alternative embodiment of the present invention. In this embodiment, a region of reduced confinement is produced by providing an intermediate section 1210 in core 1202 that has a reduced refractive index. Specifically, the refractive index $n_{int}$ of intermediate section 1210 is in the range $n_{clad} \leq n_{int} < n_{input}$, where $n_{input}$ is the refractive index of core input section 1206 and $n_{clad}$ is the refractive index of cladding 1204. In a preferred implementation of the FIG. 12 embodiment, intermediate section 1210 is formed from the same material as cladding 1204, and is constructed by removing a portion of core 1202 and back-filling the removed portion with cladding material. Intermediate section 1210 is optically coupled to input section 1206 and to an output section 1208, which will typically be formed of the same material as input section 1206 to provide good confinement of the optical mode. A substrate (not shown in FIG. 12) may be attached to the lower major surface of cladding 1204 to provide mechanical stability and to serve as a thermal heat sink.

When actuated, thin film heater 1216 generates a vertical thermal gradient in intermediate section 1210 and surrounding cladding 1204, causing a portion of the optical energy propagating through intermediate section 1210 to be extracted from the waveguide, in a manner similar to that described above. Again, reduction of the confinement of the optical mode within intermediate section 1210 (due to the relatively small refractive index difference $n_{int}-n_{clad}$) facilitates the controlled extraction of optical energy from the waveguide and allows a specified amount of signal attenuation to be accomplished within a shorter distance and/or using reduced heater power consumption relative to that required for a more strongly vertically confining waveguide. The FIG. 12 embodiment offers the further advantage of improved polarization dependent loss (PDL) relative to a VOA having a uniformly strongly confining waveguide.

Figure 10:
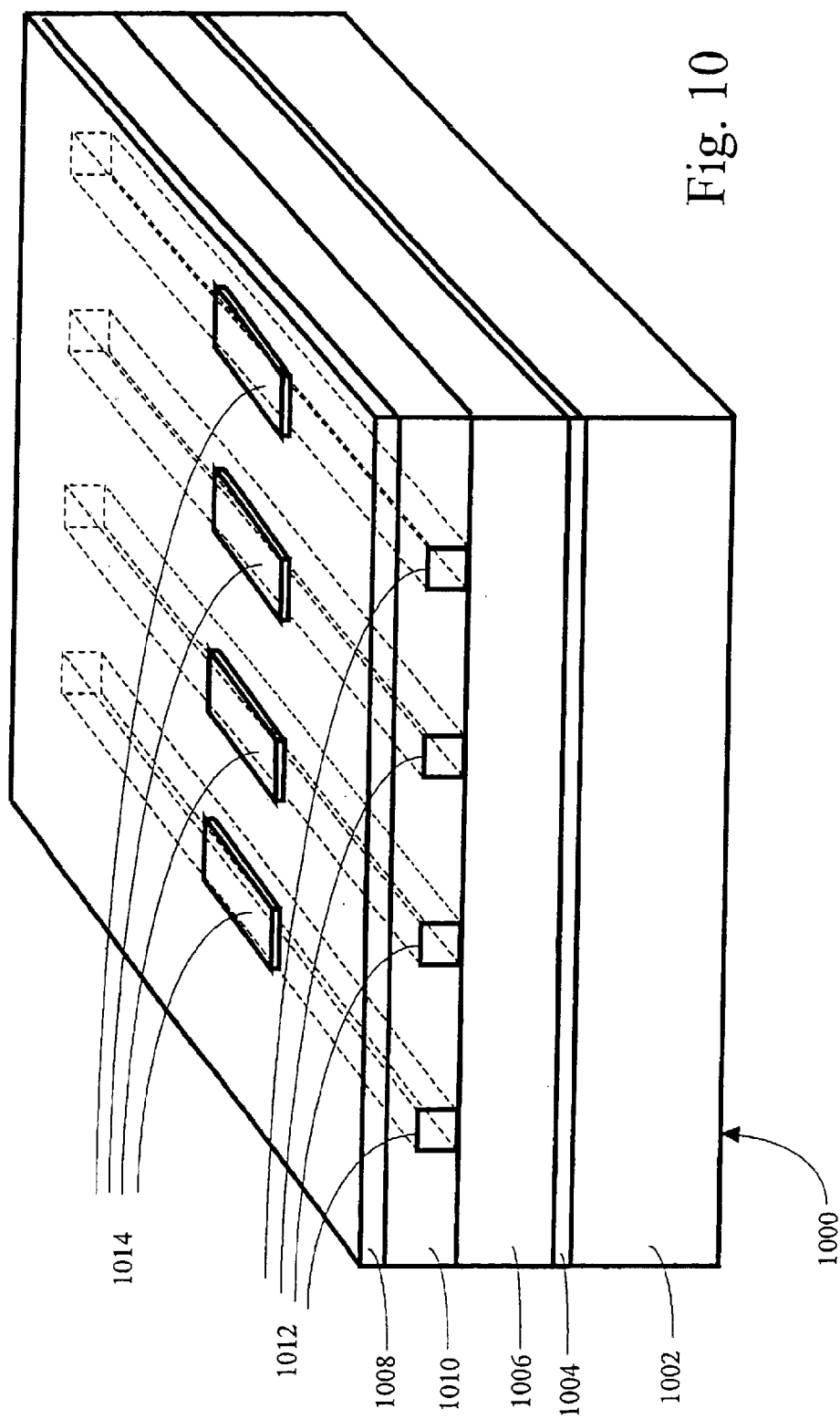
FIG. 10 is a symbolic view of a specific implementation of a multi-channel attenuator device.

FIG. 10 symbolically depicts a multi-channel VOA 1000 constructed in accordance with another, more specific embodiment of the invention. VOA 1000 is substantially similar in its structure and mode of operation to VOA 500 of FIG. 5; however, VOA 1000 employs a more complex waveguide structure wherein the upper cladding layer is formed from upper and lower sub-layers 1008 and 1010 having separately optimized properties. Beginning with the lowermost layer of VOA 1000 and proceeding upwardly, an adhesion layer 1004 is deposited (typically by spinning) on top of substrate 1002 to enable uniform adhesion between substrate 1002 and lower cladding layer 1006 and prevent de-lamination. Adhesion layer 1004 will preferably have a refractive index that is less than that of substrate 1002 but greater than or equal to the of lower cladding 1006 in order to prevent adhesion layer 1004 from serving as a waveguide for light removed from cores 1012. In an exemplary implementation of VOA 1000, adhesion layer will be formed from a polymer having a refractive index of about 1.514, whereas substrate 1002 and lower cladding layer 1006, which vertically bound adhesion layer 1004, will have respective refractive indices of 1.52 and 1.514 (or less). Adhesion layer 1004 will have a thickness of approximately 1 μm.

Lower cladding layer 1006 is preferably formed from a polymeric material deposited to a typical thickness of 30 μm on top of adhesion layer 1004. As described above in connection with FIG. 5, lower cladding layer 1006 has a thermo-optic coefficient matched to that of the core 1012 material in order to minimize device sensitivity to changes in ambient temperature. Cores 1012 may be formed by depositing a core layer of suitable thickness on top of lower cladding 1006, and then defining the lateral boundaries of each core 1012 by a subsequent RIE step, as described above in connection with FIG. 6. The resultant cores 1012 will each have a rectangular cross-section with exemplary dimensions of 7.5 μm wide by 7.5 μm high. In order to provide confinement of the optical mode, cores 1012 have a refractive index that is greater (at a given temperature) than the refractive index of the adjacent cladding layers. In one example, cores 1012 have a refractive index of 1.52, which exceeds that of the adjacent cladding layers by approximately 0.005.

The upper cladding of VOA 100 comprises a lower or first sublayer 1010 and an upper or second sublayer 1008 deposited sequentially on top of lower cladding layer 1006 and cores 1012. Lower sublayer 1010 will typically have a thickness of about 10.5 μm and extend to approximately 3 μm above the top of cores 1012. Lower sublayer 1010 may be deposited in a two-step process to provide better sublayer planarity. The lower sublayer 1010 material is selected to have a thermo-optic coefficient matched to that of core 1012 material in order to avoid or minimize operational sensitivity to ambient temperature, in the manner discussed in greater detail above. Lower sublayer 1010 may, for example, be formed from the same polymeric material as is used to form lower cladding layer 1006 (which, as stated above, has a typical refractive index of 1.514).

Figure 11A:
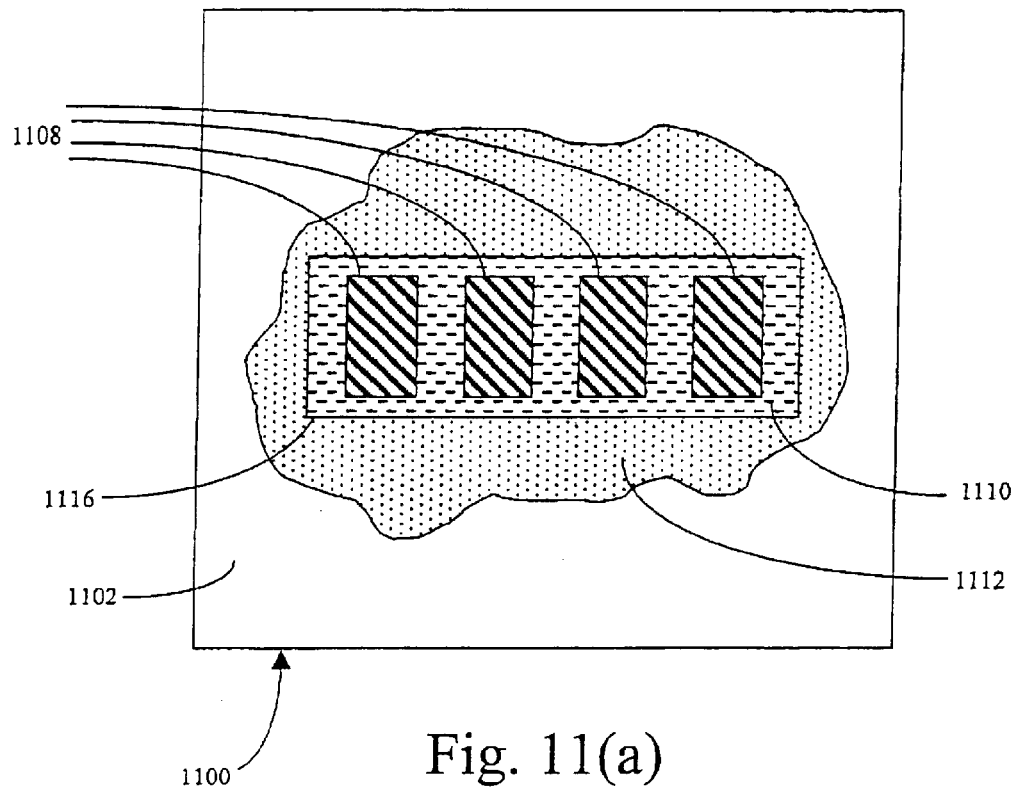
FIGS. 11(a) and 11(b) are, respectively, top plan and cross-sectional views of an attenuator device having an attached cover plate, a portion of the cover plate being cut away in FIG. 11(a) to reveal the arrangement of underlying structures.
Figure 11B:
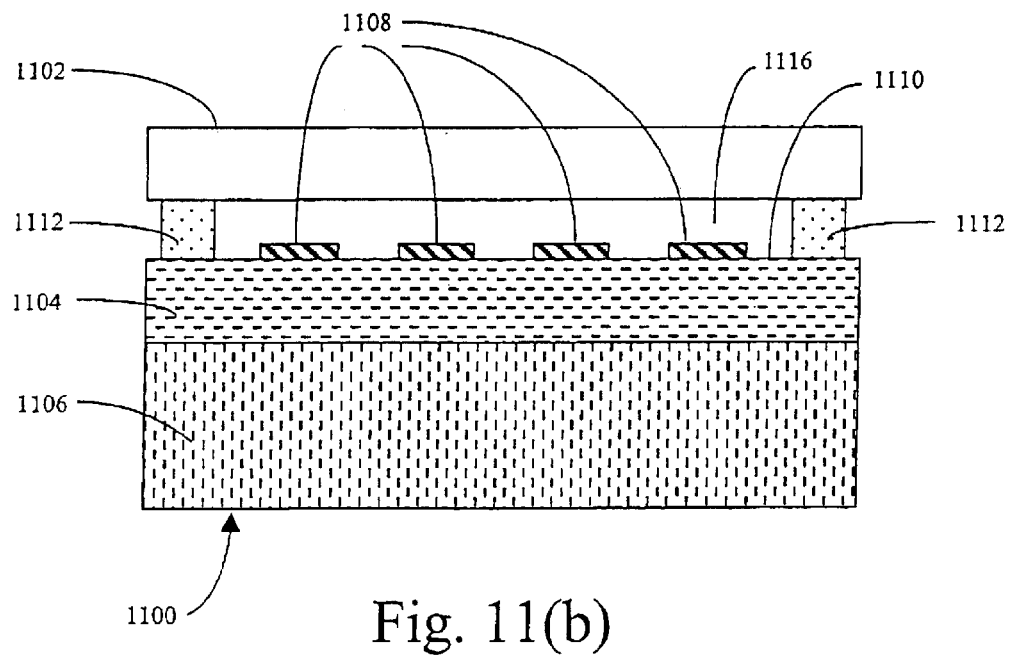

Upper sublayer 1008 may be deposited on top of lower sublayer 1010 by spinning or other conventional technique. Upper sublayer 1008 is preferably formed from a polymer material having a relatively low refractive index to optically isolate the optical energy propagating along cores 1012 from heaters 1014 and prevent undesirable absorption of the optical modes. In an exemplary implementation of the FIG. 10 embodiment, upper sublayer 1008 has a thickness of about 3 μm and a refractive index of 1.48; however, other polymer materials having lower refractive indices may be preferable in certain implementations. Since upper sublayer 1008 does not bound cores 1012, their respective thermo-optic coefficients need not be matched. Following deposition of upper sublayer 1008, thin film heaters 1014, positioned above cores 1012, may then be formed on the upper surface of upper sublayer using the photolithography techniques described above or by any suitable alternatives. The vertical distance between each thin film heater 1014 and the upper (proximal) boundary of the associated core 1012 will typically be in the range of 4.0–8.0 μm, with a preferred value of 5.0 μm FIGS. 11(*a*) and 11(*b*) depict a VOA 1100 to which a cover plate 1102 has been attached, thereby forming a quasi-hermetic package for VOA 1100. A portion of cover plate 1102 has been cut away in FIG. 11(*a*) to reveal underlying structures so that the features and purpose of this embodiment may be more easily comprehended. As shown in FIG. 11(*b*), which depicts a vertical cross-section taken through the midpoint of heaters 1108, VOA 1100 generally comprises a polymer stack 1104 deposited on top of substrate 1106 and a set of heaters 1108 arranged on the upper major surface 1110 of polymer stack 1104. Polymer stack 1104 will include a core region bounded by a set of cladding layers, and may be formed in accordance with any of the embodiments described above. Cover plate 1102 serves to protect the upper major surface of the polymer stack 1104 from contact with corrosive, reactive, or otherwise deleterious components in the ambient atmosphere and thereby prolong VOA 1100 operational lifetime. Cover plate 1102 may consist of a glass or other suitable material and will have planar dimensions which are generally coextensive with those of VOA 1100. Typical cover plate 1102 thickness will be approximately 1000 μm.

Cover plate 1002 is preferably affixed to the upper major surface of polymer stack 1104 by means of a thixotropic adhesive 1112, such as a conventional epoxy. Adhesive 1112 may be applied to the upper major surface of polymer stack 1104 and/or the facing (lower) surface of cover plate by stencil printing or other technique known in the art, and curing of the adhesive may be accomplished thermally, by exposure to UV radiation, or by another method appropriate to the selected adhesive. As depicted in FIG. 11(*b*), the cured adhesive 1112 acts as a stand-off structure such that cover plate 1102 and polymer stack 1104 are held in slightly vertically spaced apart relation. The vertical distance between the facing surfaces of the two components will typically be about 150 μm.

Adhesive 1112 is preferably not applied in areas above and immediately adjacent to heaters 1108, thereby creating a void 1116 surrounding the heaters. This arrangement (i.e., avoiding thermal contact between heaters 1108 and cover plate 1102 and/or adhesive 1112) minimizes the undesirable conduction of heat generated by heaters 1108 upwardly into cover plate and adhesive 1112. By minimizing such upward conduction, thermal energy generated by heaters 1108 is directed primarily downwardly into polymer stack 1104, which allows steep thermal gradients to be developed within the waveguides with relatively small heater 1108 power consumption. In this manner, VOA 1100 will possess a high attenuation efficiency (i.e., amount of attenuation effected per unit of power supplied).

It will be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment and for particular applications, e.g., optical communications, those skilled in the art will recognize that its usefulness is not limited thereto and that the present invention can be beneficially utilized in any number of environments and implementations. Accordingly, the claims set forth below should be construed in view of the full breadth and spirit of the invention as disclosed herein.

What is claimed is:

1. An optical attenuator device selectively operable in a non-actuated state and an actuated state, comprising:
    a waveguide for guiding optical energy, the waveguide having an input section coupled to an intermediate section, said intermediate section having reduced confinement of the optical energy relative to said input section, said intermediate section having a core and a cladding bounding said core, said core and cladding having matched thermo-optic coefficients, said core having a refractive index that is less than a refractive index of a core of said input section and greater than or equal to a refractive index of said cladding; and
    a thermal source, disposed above said intermediate section, for generating a temperature gradient within a portion of said intermediate section along a vertical axis thereof when said device is in said actuated state, said temperature gradient being sufficient to alter a refractive index profile within said intermediate section such that a portion of said optical energy is deflected downwardly and extracted from said intermediate section.

2. The device of claim 1, wherein said core of said intermediate section has at least one transverse dimension that is significantly larger than a corresponding transverse dimension of a core of said input section.

3. The device of claim 2, wherein said intermediate section is coupled to said input section by an adiabatic taper.

4. The device of claim 1, wherein said waveguide further comprises an output section optically coupled to said intermediate section, said output section having increased confinement of the optical energy relative to said intermediate section.

5. The device of claim 1, wherein said core is segmented.

6. The device of claim 1, wherein said refractive index of said core of said intermediate section is equal to said refractive index of said cladding.

7. The device of claim 6, wherein said core of said intermediate section and said cladding are formed from the same material.

8. The device of claim 1, wherein said portion of said optical energy extracted from said intermediate section is adjusted by varying an electrical control signal applied to said thermal source.

9. The device of claim 1, wherein said core and said cladding are formed from polymeric materials.

10. An optical attenuator device selectively operable in an actuated state and a non-actuated state, comprising;
- a core;
- a lower cladding layer downwardly bounding said core;
- a substrate affixed to said lower cladding layer;
- an adhesion layer interposed between said substrate and said lower cladding layer, said adhesion layer has having a refractive index which is less than the refractive index of said substrate and greater than or equal to the refractive index of said lower cladding layer;
- a first upper cladding sublayer upwardly and laterally bounding said core, wherein said core, said lower cladding layer and said first upper cladding sublayer have matched thermo-optic coefficients;
- a second upper cladding sublayer upwardly adjacent to said first upper cladding sublayer and having a refractive index substantially lower than the refractive index of said first upper cladding sublayer; and
- a resistive heater positioned above said core, said resistive heater being configured to generate a thermal gradient within said core, when said attenuator device is in the actuated state, such that the refractive index of a portion of said core is decreased below the refractive index of a portion of said lower cladding layer located downwardly adjacent to said core, causing a portion of the optical energy traveling along said core to be deflected downwardly and extracted from said core.

11. The device of claim 10, wherein said core, said lower cladding layer, said first upper cladding sublayer, and said second upper cladding sublayer all comprise polymeric materials.

12. The device of claim 10, wherein said portion of said optical energy extracted from core is adjusted by varying an electrical control signal applied to said resistive heater.

13. The device of claim 10, wherein the portion of optical energy extracted from said core may be varied in a range between around 0% to around 99.9%.

14. An optical attenuator device selectively operable in an actuated state and a non-actuated state, comprising:
- a core;
- a lower cladding layer downwardly bounding said core;
- a first upper cladding sublayer upwardly and laterally bounding said core, wherein said core, said lower cladding layer and said first upper cladding sublayer have matched thermo-optic coefficients;
- a second upper cladding sublayer upwardly adjacent to said first upper cladding sublayer and having a refractive index substantially lower than the refractive index of said first upper cladding sublayer; and
- a resistive heater positioned above said core, said resistive heater being configured to and being capable of generating an average vertical thermal gradient within said core of at least 0.53° C./$\mu$m, when said attenuator device is in the actuated state, such that the refractive index of a portion of said core is decreased below the refractive index of a portion of said lower cladding layer located downwardly adjacent to said core, causing a portion of the optical energy traveling along said core to be deflected downwardly and extracted from said core.

15. The device of claim 14, wherein said core, said lower cladding layer, said first upper cladding sublayer, and said second upper cladding sublayer all comprise polymeric materials.

16. The device of claim 14, wherein said portion of said optical energy extracted from core is adjusted by varying an electrical control signal applied to said resistive heater.

17. The device of claim 14, wherein the portion of optical energy extracted from said core may be varied in a range between around 0% to around 99.9%.

18. An optical attenuator device selectively operable in an actuated state and a non-actuated state, comprising:
- a core;
- a lower cladding layer downwardly bounding said core;
- a first upper cladding sublayer upwardly and laterally bounding said core, wherein said core, said lower cladding layer and said first upper cladding sublayer have matched thermo-optic coefficients;
- a second upper cladding sublayer upwardly adjacent to said first upper cladding sublayer and having refractive index substantially lower than the refractive index of said first upper cladding sublayer; and
- a resistive heater positioned above said core, said resistive heater being configured to and being capable of generating an average vertical thermal gradient within said core of at least 0.67° C./$\mu$m, when said attenuator device is in the actuated state, such that the refractive index of a portion of said core is decreased below the refractive index of a portion of said lower cladding layer located downwardly adjacent to said core, causing a portion of the optical energy traveling along said core to be deflected downwardly and extracted from said core.

19. The device of claim 18, wherein said core, said lower cladding layer, said first upper cladding sublayer, and said second upper cladding sublayer all comprise polymeric materials.

20. The device of claim 18, wherein said portion of said optical energy extracted from core is adjusted by varying an electrical control signal applied to said resistive heater.

21. The device of claim 18, wherein the portion of optical energy extracted from said core may be varied in a range between around 0% to around 99.9%.

22. An optical attenuator device selectively operable in an actuated state and a non-actuated state, comprising:
- a core;
- a lower cladding layer downwardly bounding said core;
- a first upper cladding sublayer upwardly and laterally bounding said core, wherein said core, said lower cladding layer and said first upper cladding sublayer have matched thermo-optic coefficients;
- a second upper cladding sublayer upwardly adjacent to said first upper cladding sublayer and having a refractive index substantially lower than the refractive index of said first upper cladding sublayer; and
- a resistive heater positioned above said core but no more than 5 $\mu$m above an upper boundary of said core, said resistive heater being configured to generate a thermal gradient within said core, when said attenuator device is in the actuated state, such that the refractive index of a portion of said core is decreased below the refractive index of a portion of said lower cladding layer located downwardly adjacent to said core, causing a portion of the optical energy traveling along said core to be deflected downwardly and extracted from said core.

23. The device of claim 22, wherein said core, said lower cladding layer, said first upper cladding sublayer, and said second upper cladding sublayer all comprise polymeric materials.

24. The device of claim 22, wherein said portion of said optical energy extracted from core is adjusted by varying an electrical control signal applied to said resistive heated.

25. The device of claim 22, wherein the portion of optical energy extracted from said core may be varied in a range between around 0% to around 99.9%.

* * * * *